H. M. BROOKFIELD.
MACHINE FOR MAKING GLASS ARTICLES.
APPLICATION FILED MAY 28, 1909.

1,011,023.

Patented Dec. 5, 1911.

7 SHEETS—SHEET 1.

Witnesses:
C. A. Jarvis.
C. T. Neal

Inventor:
Henry M. Brookfield
by Emmons R. Drowell
Attorney

H. M. BROOKFIELD.
MACHINE FOR MAKING GLASS ARTICLES.
APPLICATION FILED MAY 28, 1909.
1,011,023.
Patented Dec. 5, 1911.
7 SHEETS—SHEET 2.
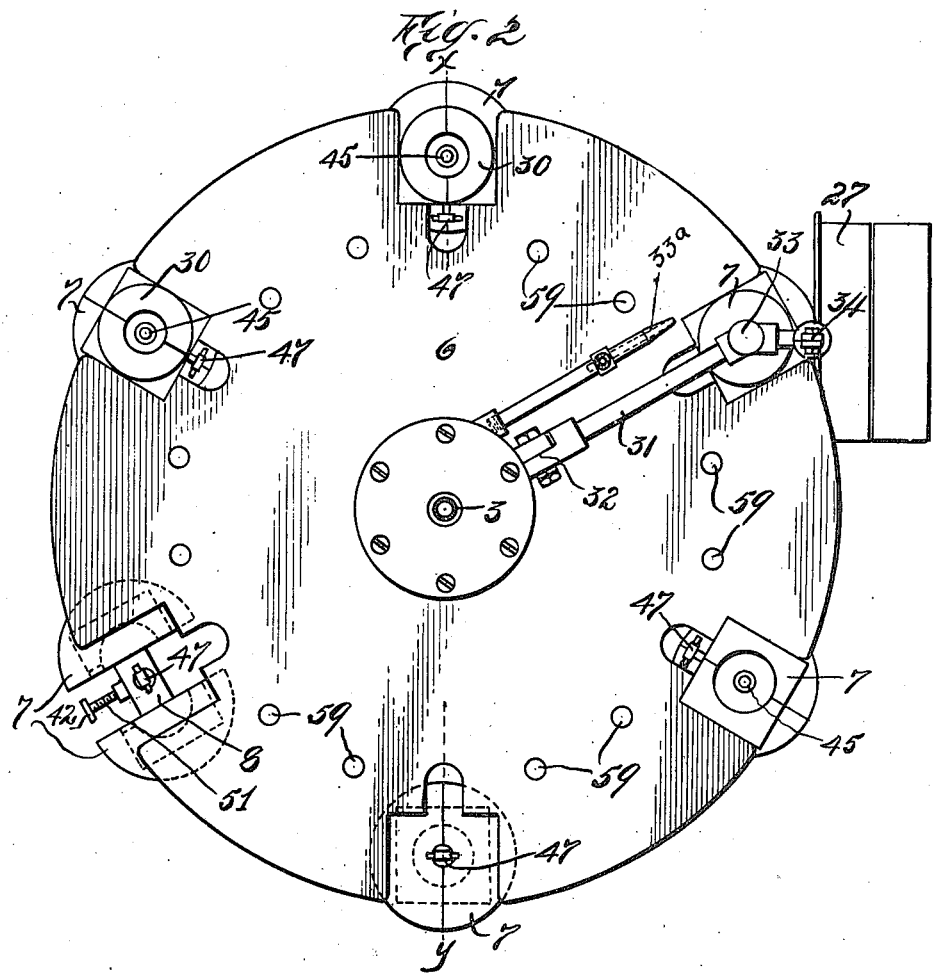
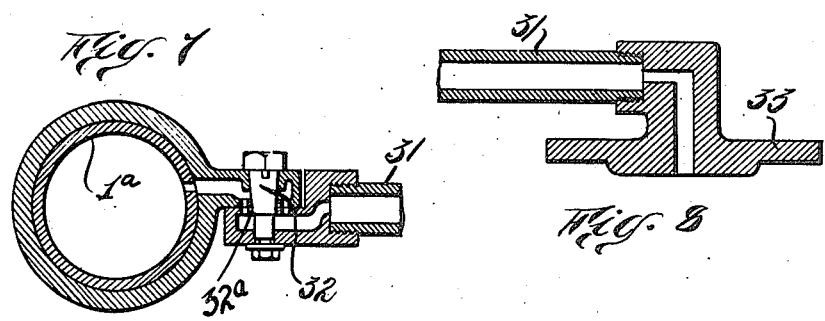
Witnesses
C. A. Jarvis
C. T. Neal
Inventor:
Henry M. Brookfield
by Emerson R. Newell
Attorney.

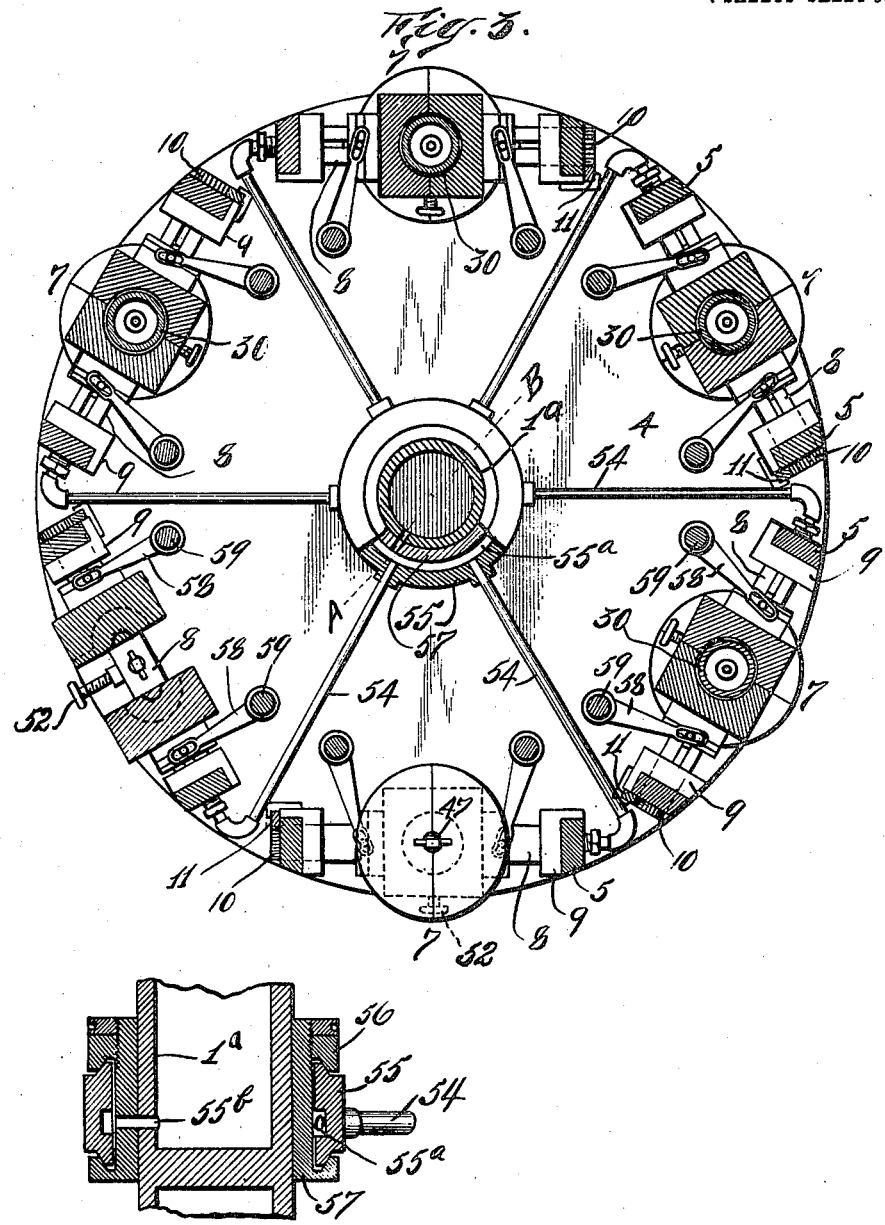

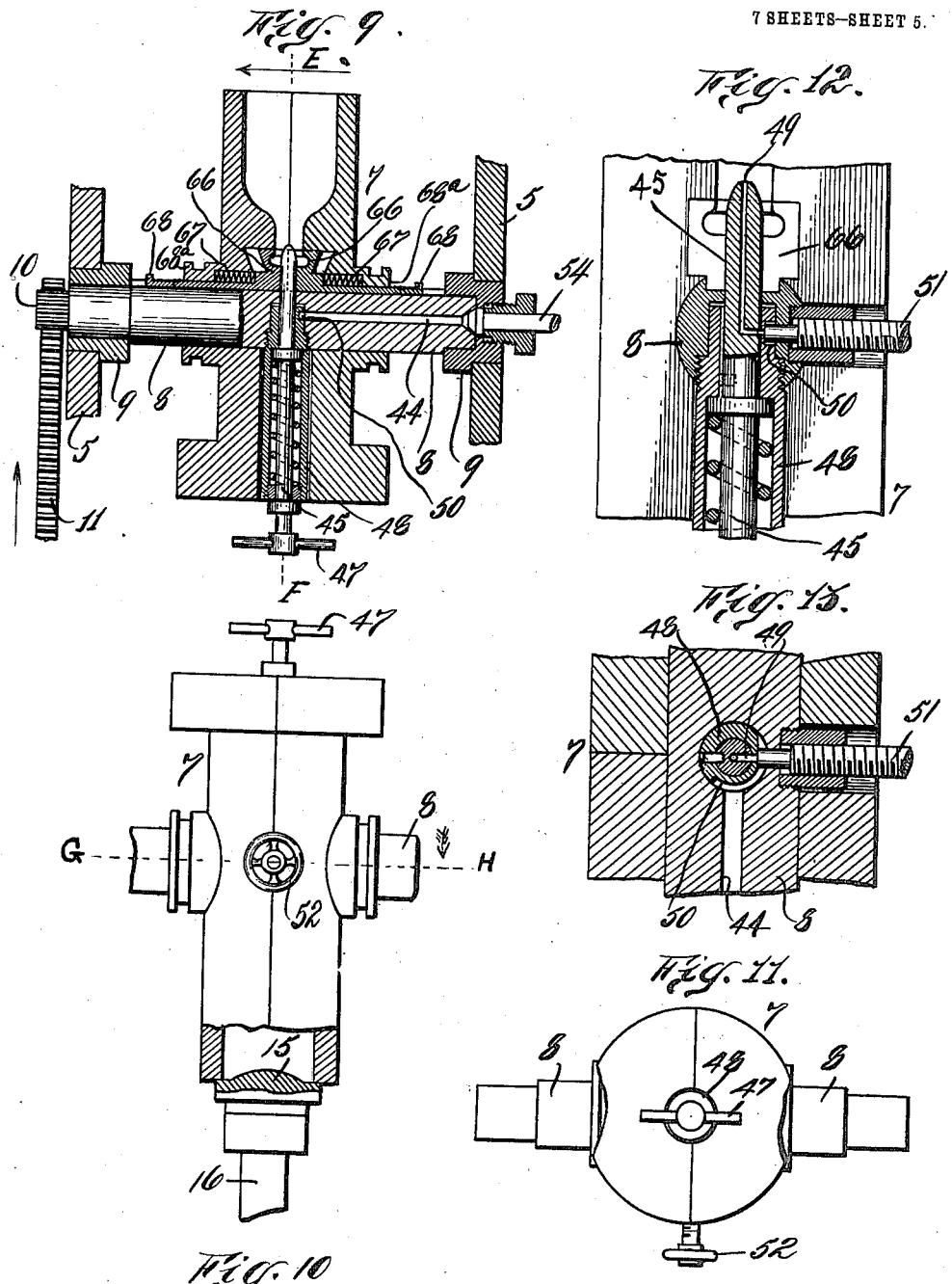

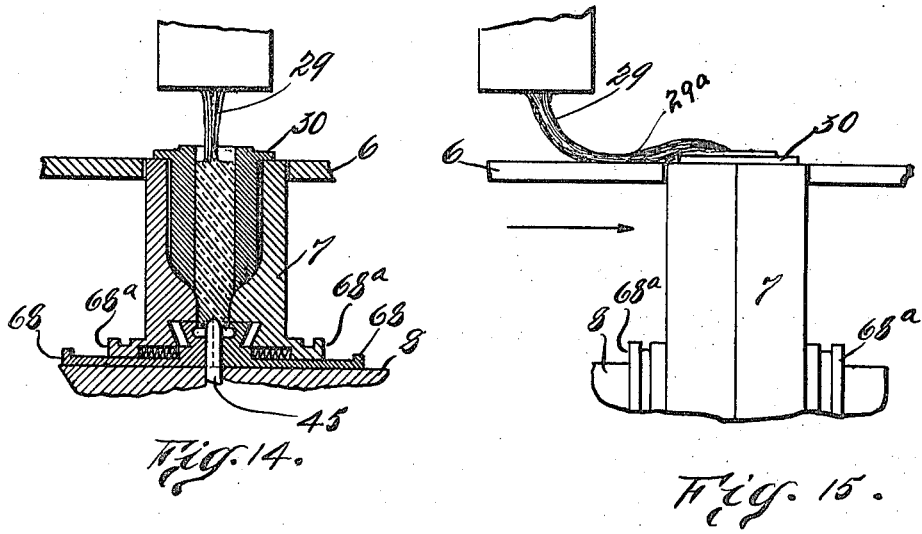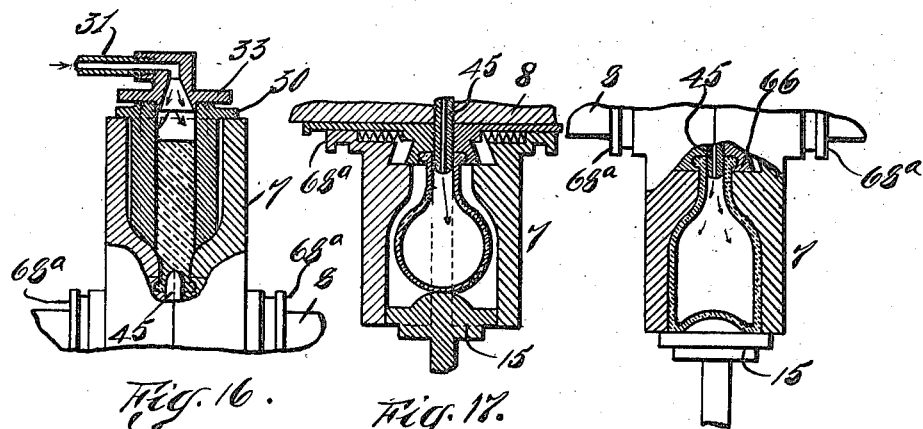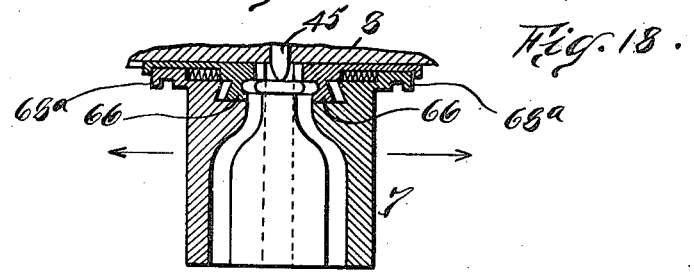

H. M. BROOKFIELD.
MACHINE FOR MAKING GLASS ARTICLES.
APPLICATION FILED MAY 28, 1909.
1,011,023.
Patented Dec. 5, 1911.
7 SHEETS—SHEET 7.
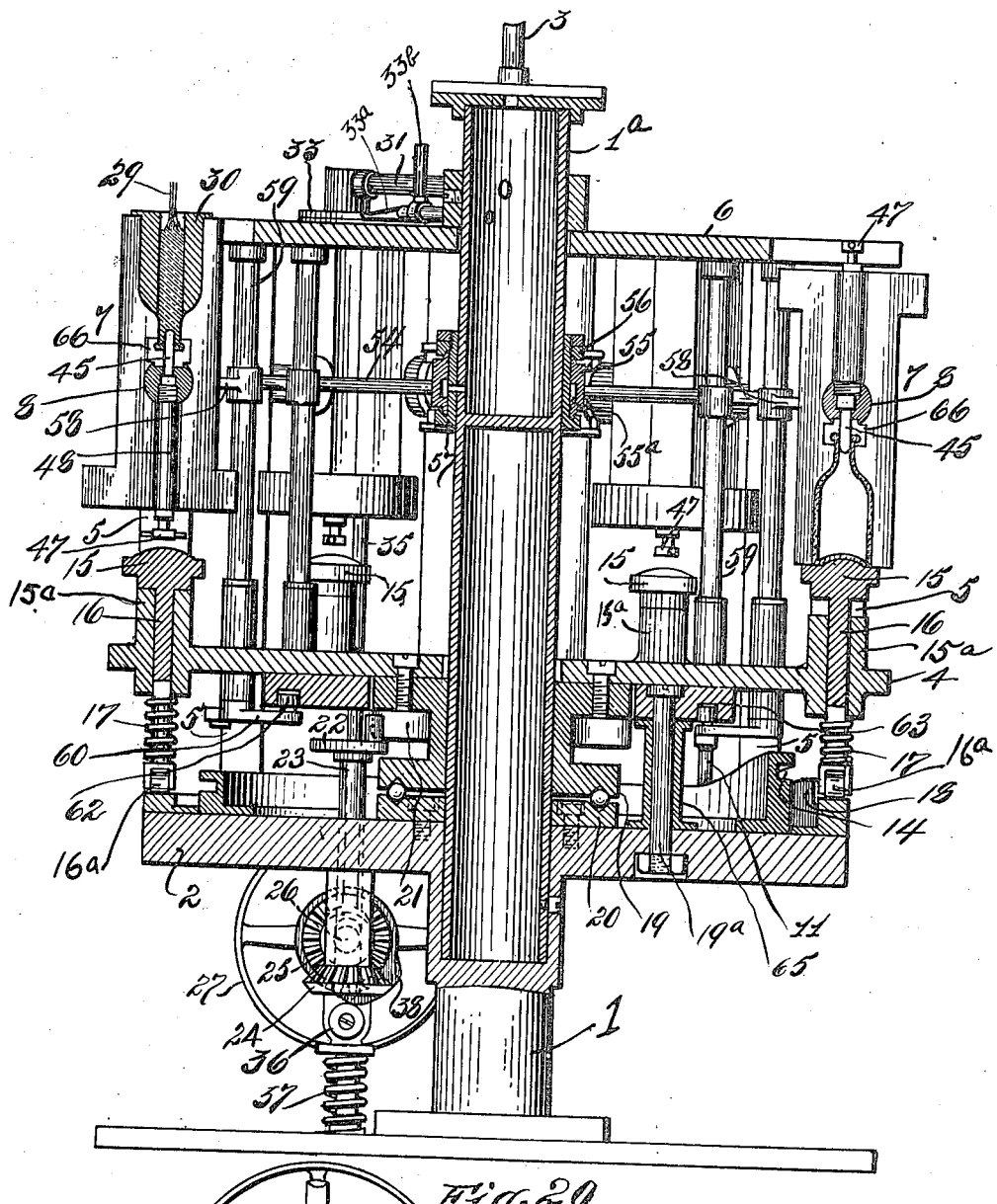
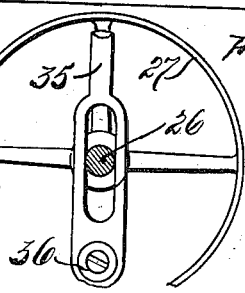

UNITED STATES PATENT OFFICE.

HENRY M. BROOKFIELD, OF NEW YORK, N. Y., ASSIGNOR TO THE BROOKFIELD GLASS COMPANY, OF NEW YORK, N. Y., A CORPORATION OF NEW JERSEY.

MACHINE FOR MAKING GLASS ARTICLES.

1,011,023.  Specification of Letters Patent.  Patented Dec. 5, 1911.

Application filed May 28, 1909. Serial No. 498,997.

*To all whom it may concern:*

Be it known that I, HENRY M. BROOKFIELD, a citizen of the United States, residing at New York city, New York, have invented certain new and useful Improvements in Machines for Making Glass Articles, of which the following is a clear, full, and exact description.

The present improvement relates to machines for making glass articles, particularly bottles and similar hollowware of blown glass.

The invention consists in the various arrangements and combination of parts to make up a machine which will perform automatically the several steps in the process of blowing glass bottles.

The invention also consists of a rotating table carrying a plurality of molds and rotating the table to bring said molds successively under a supply of molten glass. The table is preferably rotated in an intermittent manner beneath the glass supply, and at each period of rest for the mold after leaving the said glass supply, mechanisms are brought into play for performing one of the steps in the operation of forming a bottle. At the last step before completing the circuit and again coming beneath the glass supply, the mold is relieved of its finished bottle and made ready for a repetition of the process.

Among other features of my invention is a reversible mold arranged to receive glass at its larger end and having means to force the molten glass well down into all corners of the mold. After the mold is reversed, air is introduced into the interior of the blank, thus formed, and sufficient pressure is applied to blow the same into the shape of the mold.

My preferred arrangement will be described in detail in the specification and understood from reference to the drawings accompanying the same.

My invention will be particularly defined in the claims.

Figure 1:
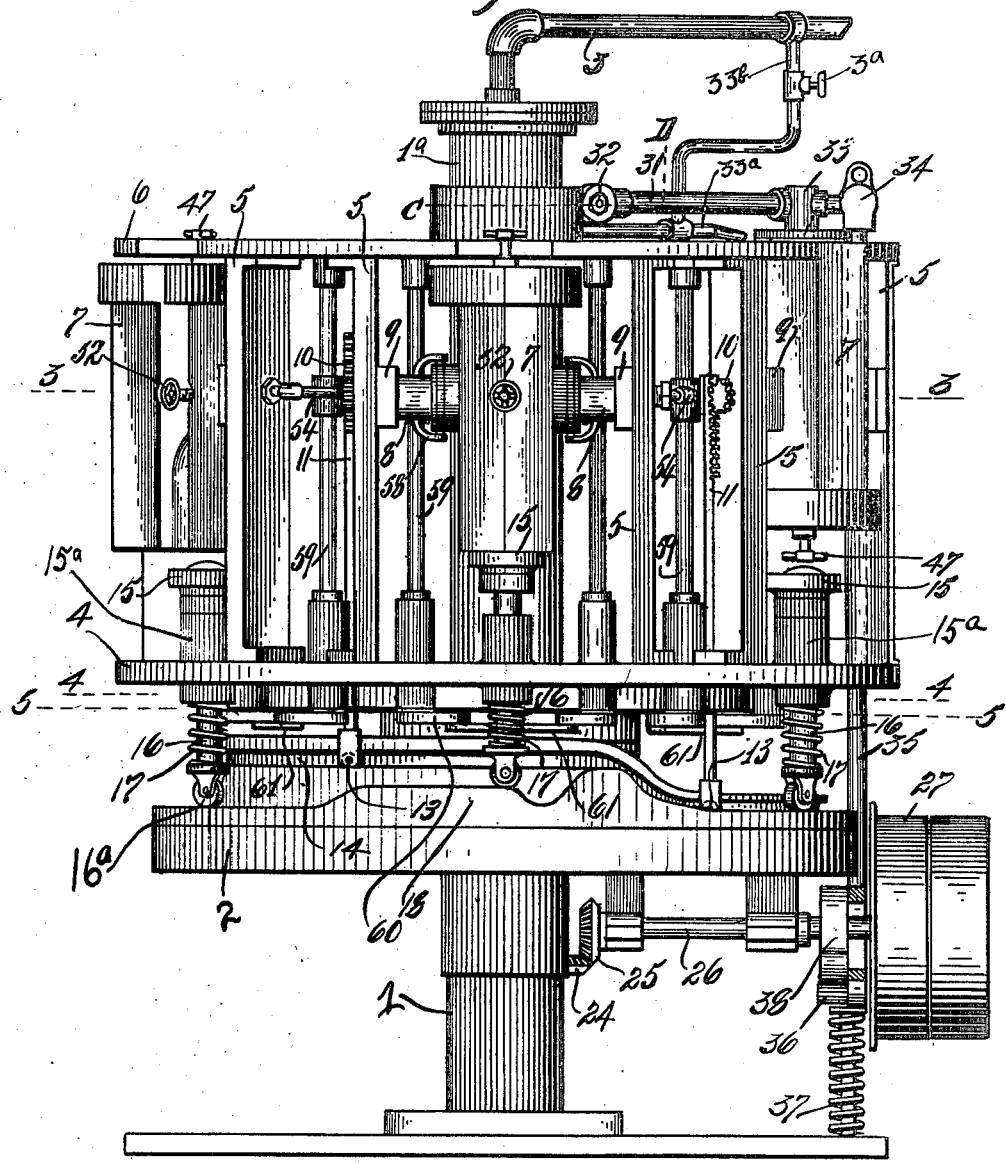
Figures 21, 22:
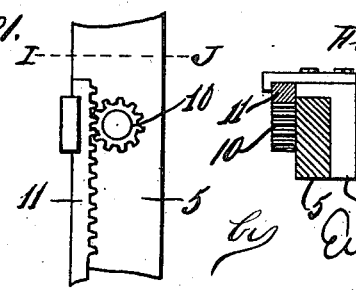
Figure 4:
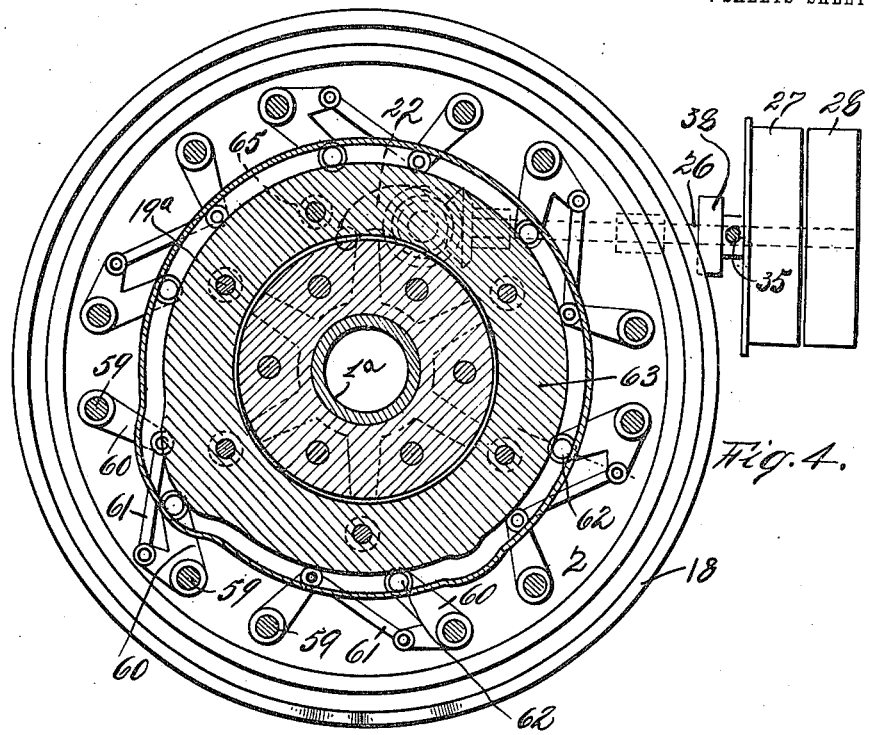
Figure 5:
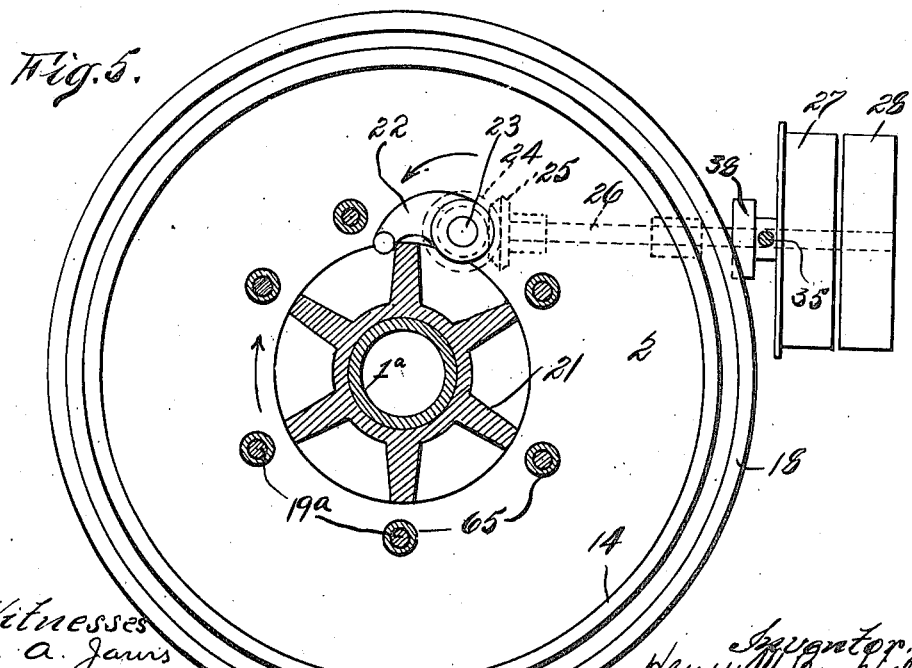

In the preferred manner of illustrating my invention shown in the drawings, Figure 1 is a front elevation of the entire machine; Fig. 2 is a plan of the machine; Fig. 3 is a section taken through line 3—3 of Fig. 1; Fig. 4 is a section through line 4—4 of Fig. 1; Fig. 5 is a section through line 5—5 Fig. 1 with some of the parts removed for the sake of clearness; Fig. 6 is a detail section through line A—B of Fig. 3, showing the traveling connection between the tubular post and air conductors; Fig. 7 is a section of the tubular post and the blow head pipe through line C—D of Fig. 1; Fig. 8 is a further detached section of the blow head pipe; Fig. 9 is a vertical section of one of the molds and a partial section of one of the trunnions upon which it is mounted; Fig. 10 is an elevation of one of the molds inverted, showing the lower end of the same in section; Fig. 11 is a top view of the mold shown in the same position as Fig. 10; Fig. 12 is a partial section through line E—F Fig. 9; looking in the direction of the arrow; Fig. 13 is a partial section through line G—H Fig. 10, looking in the direction of the arrow; Figs. 14 to 19, inclusive, are details of the mold in different positions, showing the various steps of the operation; Fig. 20 is a vertical section of the entire machine through line X—Y Fig. 2; Fig. 21 is a fragmentary detail of the rack for operating the mold trunnions; Fig. 22 is a section through I—J Fig. 21; and Fig. 23 is a detail of the lower end of the blow-head operating rod.

Referring to the drawings, 1 represents a central supporting post which supports the entire machine, and resting upon which is fixed a vertical tubular post $1^a$ as shown more clearly in Fig. 20. Within the tubular post is confined a supply of compressed air for performing certain of the blowing operations hereinafter to be described. Any usual supply pipe, such as 3, may be led to the top of the tubular post for introducing air therein. Extending laterally from the lower end of the post, preferably integral therewith, as shown in the drawings, is a circular cam and bearing plate 2. Supported upon the bearing plate and mounted to rotate around the tubular post $1^a$ is a mold table, consisting of upper and lower platforms 6 and 4 respectively, connected by upright standards 5. A ball bearing contact is formed between the lower platform 4 and the supporting cam plate 2, by means of the coöperating bearing plates 19 and 20, the former of which is fixed to the lower platform 4 and the latter fixed to the supporting plate 2. Preferably integral with the bearing plate 19 is a star wheel 21, shown more clearly in Figs. 4 and 5, by which the mold table is rotated. An operating arm 22 mounted on a vertical shaft 23 engages the star wheel 21 for turning the same. The shaft 23 is operated by means of beveled gearing 24, 25, through shaft 26 from a belt pulley 27.

Preferably at equal distances around the mold table are arranged molds 7, the particular construction of which will be later described. These molds are mounted upon trunnions 8, as shown in Figs. 1 and 9, and these trunnions are rotatably mounted in bearings 9 set in the upright standards 5. At one end of one of the trunnions is fixed a pinion 10, with which engages an operating rack 11. This operating rack 11 is preferably formed in a vertically reciprocating rod, having guideways upon the standard 5, as shown in Fig. 21, and having the pin 13 at its lower end for running in a grooved cam 14 fixed to the supporting plate 2. It will be seen that as the table rotates, a vertical reciprocation of these racks will be caused by the contour of the cam 14 and that the molds will be inverted thereby. This operation is timed to take place at the proper period in the operation of blowing the blank.

Vertically reciprocating plungers 15 slidably mounted in guide collars 15$^a$ of the lower platform 4 of the table serve as bottoms for the various molds, and are operated by rods 16 at their lower end. These rods 16 carry rollers 16$^a$ which engage with cam 18 on the supporting plate 2, and a spring 17 surrounding said rod 16 tends to normally keep the same down.

Means for opening and closing the molds automatically consist of a series of oscillating rods 59 vertically mounted in the mold table (two for each mold) and having yoke arms 58 which engage grooved collars on the separate halves of the mold, shown more clearly in Figs. 1, 3 and 4. The lower ends of each pair of rods which act to open any one particular mold are provided with arms 60 connected by a link 61, which cause them to operate simultaneously in opening the halves of the mold. One of the arms 60 as shown in Fig. 4 is preferably in the form of an angle lever and has an extension with a pin 62 running in the cam 63 for oscillating the arm and the rod. The cam 63 as shown in Fig. 20 is connected to the stationary supporting plate 2 by means of tie rods 19$^a$, and is therefore firmly held in a stationary position. Spools 65 surrounding the tie rods 19$^a$ separate and support cam plate 63 from and upon plate 2.

Referring to Figs. 9 to 13 inclusive, I will now describe the preferred construction of one of my molds. The separate halves of the mold are slidably mounted upon the trunnion 8 and keyed thereto for rotating therewith. Referring to Fig. 9, the lower end of each mold is recessed for the introduction of a guide plug 48 which is screwed into the trunnion 8. Adjacent the neck portion of each mold 7 are mounted separable halves of a supplemental neck mold 66, also keyed to trunnion 8 and which have projections 68 spaced some distance from the collar of the main mold 7. A spring 67 located between the neck molds and the main molds tends to hold the neck molds closed upon each other at all times. It will be seen that when the main molds are opened there is a slight lost motion before the supplemental neck molds open, due to the fact that the lugs 68 of the molds 66 are spaced from lugs 68$^a$ of the main molds 7. Mounted within the guide plug 48 and extending partly within the neck mold is a mandrel 45. A spring surrounding said mandrel and contained within the guide plug serves to keep it normally in its upper position, but allows it to be pulled outwardly when desired. A handle 47 is fixed to its outer end for this purpose.

An air channel 44 extends through one end of the trunnions 8 and communicates with a channel 50, extending part way around the guide plug 46, shown more clearly in Fig. 13. The mandrel 45 is also provided throughout part its length, as shown in Fig. 12, with an air channel 49 which communicates with the channel 50 of the guide plug, and therefore with the channel 44. A stem valve 51 operable by hand wheel 52 from the outside of the mold shown in Fig. 10, is provided to control the passage of air through channel 44 and up through the inside of the mandrel 45. The air channels 44 of each trunnion receive their air from air conductors 54, shown in Fig. 3. These conductors lead to the tubular post 1$^a$ containing the main supply of compressed air. The connections between these conductors 54 and the central post is shown more clearly in Fig. 6. The pipes 54 are led into a ring 55, which ring is adapted to rotate around the post 1$^a$ in contact therewith. The inner face of the ring 55 is grooved at 55$^a$, and an aperture 55$^b$ forms a communication from the inside of the tube 1$^a$ with this groove. The ring 55 is held in place as shown in Fig. 6, by means of a bearing flange 57 and a locking nut 56. It will be seen from this construction that although the table turns around the stationary post, the air within the post may still be conducted to the interior of the various molds.

The operation of blowing glass in the shape of a bottle will now be described.

Referring to Figs. 14 to 19 inclusive, 29 represents a supply of glass which, in the present case, is designed to run out in a continuous stream. As the mold table is rotated intermittently, a mold is brought beneath this stream. It will be seen from Fig. 13

14 that a blank mold 30 has previously been introduced into the mold. This is for the purpose of properly measuring the supply of glass and for effecting the proper distribution of the same longitudinally throughout the mold for the purpose of blowing, but, however, in some cases it may be desirable to dispense with the use of this blank mold 30. The next movement of the table brings the mold beneath a blow-head 33 which is constructed as shown in Figs. 1, 7, 8 and 16. This blow-head consists of a pipe 31, pivoted at 32, adjacent the tubular post 1ª and is provided with a head 33 adapted to fit over the receiving end of the mold, as shown in Fig. 16. Means are provided for raising and lowering said mold head from the receiving end of the mold, which consists of a rod 35 having universal connection therewith at 34 and having a pin 36 at its lower end which is operated by a cam 38 mounted on shaft 26. The spring 37 keeps the pin 36 in contact with the cam and moves the rod and blow-head upwardly. At the pivotal support 32 of pipe 31 is arranged an ordinary perforated disk valve 32ª, comprising two perforated disks sliding upon one another. The perforations are arranged to be in line to permit the passage of air therethrough only when the pipe 31 is in its lowered position, as will be understood. As the mold moves to its position under the blow-head, the same is brought down so that its head 33 coöperates with the rim of the supplemental mold, cutting off the stream of glass extending into said mold, and completely covers the receiving end of the mold. The stream of superfluous glass 29ª (see Fig. 15) from the supply 29 along the surface of the table to this cutting off position of the mold when it reaches blow-head 33, is discharged from the table by means of a pneumatic blast pipe 33ª attached to the stationary tubular post 1ª and located adjacent the pipe 31. A connecting pipe 33ᵇ from the air supply pipe 3 provides for a continuous current of air through this pipe 33ª, which, however, may be shut off by hand when desired by cock 3ª. Simultaneously with the lowering of the mold head its valve 32ª is automatically opened to allow the air from the main post to pass therethrough and create sufficient pressure in the mold to compress the glass well down in the neck portion thereof. With the next movement of the table the mold head is raised and the blank mold 30 is removed by hand, or by any other desired means. As soon as this is accomplished the mold is automatically inverted in the position shown in Fig. 17 and is partially opened to allow the introduction of the bottom plunger 15, which is operated to extend partly within the same and support the molten glass as shown in Fig. 17. It will be observed that although the main portions of the mold are opened, the supplemental neck molds 66 are still held closed by their springs 67 and support the upper end of the molten glass. The supporting plunger 15 slowly descends with the lump of glass, allowing the same to be distributed longitudinally lengthwise of the mold. At the next operation the mold has reached the position shown in Fig. 18, at which time the separable halves have been closed upon each other firmly, and the bottom 15 raised to close the lower end, at which time the operator may turn the valve 52 and send sufficient pressure of air through the mandrel into the neck of the glass to blow the same into the shape of the mold. The next movement of the table carrying the mold a further step actuates the oscillating rods 59 to open the molds, as shown more clearly in Fig. 2, at which time the finished bottle may be removed and taken to the annealing oven. The last operation consists in returning the mold to its original position and inserting the blank mold 30 if the same is employed, whereby it is ready to again come beneath the glass supply 29, for a repetition of the above described movements.

What I claim is:

1. In a machine for forming glass articles, the combination with means for supplying molten glass in a continuous stream, of a rotary table having a plurality of body molds thereon, means for rotating said table to bring said molds beneath the supply and momentarily retarding the same to receive glass, fluid pressure means for compressing the glass in said mold, and a fluid blast means for removing the superfluous glass from the surface of said table when said mold is carried from beneath said supply means.

2. In a machine for forming glass articles, the combination with means for supplying molten glass in a continuous stream, of a rotary table having a plurality of body molds thereon, means for rotating said table to bring said molds beneath the supply and momentarily retarding the same to receive glass, removable blank molds carried in said body molds, a blow head automatically operated to close the receiving end of said body and blank molds and coacting with the rim of said blank mold to cut off said stream, fluid pressure means operating through said blow head to compress the glass in said body and blank molds.

3. In a machine for forming glass articles, the combination with means for supplying molten glass in a continuous stream, of a rotary table having a plurality of body molds thereon, means for rotating said table to bring said molds beneath the supply and momentarily retarding the same to receive glass, removable blank molds carried in said body molds each consisting of a tubular shell having a flanged rim to engage the rim of said body mold, a blow head automatically operated to close the receiving end of said body and blank molds and coacting with the rim of said blank mold to cut off said stream, fluid pressure means operating through said blow-head to compress the glass in said body and blank molds and an air discharging nozzle adjacent said blow head for removing the superfluous glass from the surface of said table.

4. In a machine for forming glass articles, the combination with means for supplying molten glass in a continuous stream, of a rotary table having a plurality of body molds thereon, means for rotating said table to bring said molds beneath the supply and momentarily retarding the same to receive glass, removable blank molds carried in said body molds each consisting of a tubular shell having a flanged rim to engage the rim of said body mold, a blow head automatically operated to close the receiving end of said body and blank molds and coacting with the rim of said blank to cut off said stream, fluid pressure means operating through said blow head to compress the glass in said body and blank molds, an air discharging nozzle adjacent said blow head for removing the superfluous glass from the surface of said table, automatic mechanism for inverting said molds, and means for blowing the glass to the shape of said body molds when said blank molds are removed.

5. In a machine for forming glass articles, the combination with means for supplying molten glass, of a rotary table having a plurality of body molds thereon, with neck forming portions lowermost, a mandrel for each mold normally stationary but capable of longitudinal movement by hand, mounted to extend in the neck portion thereof, said mandrel also having an air passage therethrough, means for rotating said mold table to bring its molds beneath said supply and momentarily retarding the same to receive glass, fluid pressure means for compressing the glass in said mold and around said mandrel.

6. In a machine for forming glass articles, the combination with means for supplying molten glass, of a rotary table having a plurality of body molds thereon, with neck forming portions lowermost, a mandrel for each mold normally stationary but capable of longitudinal movement by hand, mounted to extend in the neck portion thereof, said mandrel also having an air passage therethrough, a valve operable from the outside of said mold for controlling the air supply through said mandrel.

7. In a machine for forming glass articles, the combination with means for supplying molten glass, of a rotary table having a plurality of body molds therein with neck forming portions lowermost, and formed of separable halves adapted to open, means for rotating said table to bring said molds beneath said supply and momentarily retarding the same to receive glass, fluid pressure means for compressing the glass in said mold, automatic mechanism for inverting said mold, and a reciprocating mold bottom adapted to extend within said inverted mold and support the glass therein, mechanism for momentarily opening said mold sufficient to allow the entrance of said mold bottom and closing the mold upon the withdrawal of the same, and means for blowing the glass to the shape of said mold.

8. In a machine for forming glass articles, the combination with means for supplying molten glass, of a rotary table having a plurality of body molds therein with neck forming portions lowermost, and formed of separable halves adapted to open, means for rotating said table to bring said molds beneath said supply and momentarily retarding the same to receive glass, a mandrel extending within said neck portion and having an air passage therethrough, fluid pressure means for compressing the glass in said mold and around said mandrel, automatic mechanism for inverting said mold, and a reciprocating mold bottom adapted to extend within said inverted mold and support the bottom of said glass, mechanism for momentarily opening said mold sufficient to allow the entrance of said mold bottom and closing the mold upon the withdrawal of the same, and means for controlling the passage of compressed air through said mandrel for blowing the glass to the shape of said mold.

9. In a machine for forming glass articles, the combination with means for supplying molten glass, of a rotary table having a plurality of body molds thereon with neck forming portions lowermost, and formed of separable halves adapted to open, means for rotating said table to bring said molds beneath said supply and momentarily retarding the same to receive glass, removable blank molds carried in said body molds, a mandrel extending within said neck portion and having an air passage therethrough, fluid pressure means for compressing the glass in said blank mold and around said mandrel to form a blank, automatic mechanism for inverting said mold, and a reciprocating mold bottom adapted to extend within said inverted mold and support the bottom of said blank, mechanism for momentarily opening said mold sufficient to allow the entrance of said mold bottom and closing the mold upon the withdrawal of the same, and means for controlling the passage of compressed air through said mandrel for blowing the glass to the shape of said body mold when said blank mold is removed.

10. In a machine for forming glass articles, the combination with means for supplying molten glass, of a rotary table having a plurality of body molds thereon with neck forming portions lowermost, and formed of separable halves adapted to open, means for rotating said table to bring said molds beneath said supply and momentarily retarding the same to receive glass, separate neck molds mounted adjacent said neck forming portions and arranged to open and close at different times than said body molds, fluid pressure means for compressing the glass in said molds, automatic mechanism for inverting said mold, and a reciprocating mold bottom adapted to extend within said inverted mold and support the bottom of said glass, mechanism for momentarily opening said mold sufficiently to allow the entrance of said mold bottom and closing the mold upon the withdrawal of the same, and means for blowing the glass to the shape of said mold.

11. In a machine for forming glass articles, in combination with means for supplying molten glass in a continuous stream, of a rotary table having a plurality of body molds thereon with neck forming portions lowermost and formed of separable halves adapted to open, a mandrel for each mold normally stationary but capable of longitudinal movement by hand mounted to extend partly within the neck portion thereof, removable blank molds carried in said body molds consisting of tubular shells having flanges to engage the rims of said body molds, means for rotating said table to bring said molds beneath the glass supply and momentarily retarding the same to receive glass, a blow head automatically operated to inclose the receiving end of said mold and coact with the rim of said blank mold to cut off said stream, fluid pressure means operating through said blow head to compress the glass in said mold to form a blank, automatic mechanism for inverting said mold, and a reciprocating mold bottom adapted to extend within said inverted mold and support the bottom of said blank, and mechanism for momentarily opening said mold sufficient to allow the entrance of said mold bottom and closing the mold upon withdrawal of the same, and means for controlling the passage of compressed air through said mandrel for blowing the glass to the shape of the body mold when said blank mold is removed.

12. In a machine for forming glass articles, in combination with means for supplying molten glass, of a tubular post containing a supply of compressed air, a table rotatably mounted thereon and having a plurality of body molds supported on trunnions with bearings in said table, means for rotating said table to bring said molds beneath the glass supply and momentarily retarding the same to receive glass, a blow head connected with said tubular post and automatically operated to close the receiving end of said mold and compress the glass therein, an air passage through a trunnion of each mold communicating therewith, and air conductors leading from the tubular post to said air passages, and means controlling the supply of air through said passageways to blow the glass in the shape of the body mold.

13. In a machine for forming glass articles, in combination with means for supplying molten glass in a continuous stream, of a tubular post containing a supply of compressed air, a table rotatably mounted thereon and having a plurality of body molds supported on trunnions with bearings in said table, means for rotating said table to bring said molds beneath the glass supply and momentarily retarding the same to receive glass, a blow head connected with said tubular post automatically operated to inclose the receiving end of said mold to cut off said stream and compress the glass in said mold, an air discharging nozzle adjacent said blow head and also connected to said post for removing superfluous glass from the surface of said table, and an air passage through a trunnion of each mold communicating therewith, and air conductors leading from the tubular post to said passageways, and means for controlling the supply of air through said passageways to blow the glass to the shape of the body mold.

14. In a machine for forming glass articles, in combination with means for supplying molten glass, of a rotatably mounted table consisting of upper and lower platforms connected by uprights, reversible body molds supported on trunnions having their bearings in said uprights and their receiving ends adjacent said upper platform, a stationary cam plate mounted below said table and vertically reciprocating mold bottoms for said molds carried in said lower platform and operated by said cam plate.

15. In a machine for forming glass articles, in combination with means for supplying molten glass, of a rotatably mounted table consisting of upper and lower platforms connected by uprights, reversible body molds supported on trunnions, pinions fixed to the ends of said trunnions, a stationary cam plate mounted below said table, vertically reciprocating mold bottoms for said molds and vertically reciprocating rack bars engaging the pinions on said trunnions carried by said lower platform and operated by said cam plate.

16. In a machine for forming glass articles, in combination with means for supplying molten glass, of a tubular post containing a supply of compressed air, a table rotatably mounted thereon consisting of upper and lower platforms connected by uprights, reversible body molds supported on trunnions having their bearings in said uprights, air connections from said tubular post to the interior of said molds, a stationary cam plate mounted below said table and vertically reciprocating mold bottoms for said molds carried in said lower platform and operated by said cam plate.

17. In a machine for forming glass articles, in combination with means for supplying molten glass, of a tubular post containing a supply of compressed air, a table rotatably mounted thereon and having a plurality of body molds supported on trunnions with bearings in said table, means for rotating said table to bring said molds beneath the glass supply and momentarily retarding the same to receive glass, means for compressing the glass therein, an air passage through a trunnion of each mold communicating therewith, and air conductors leading from the tubular post to said air passages, and means controlling the supply of air through said passageways to blow the glass in the shape of the body mold.

18. In a machine for forming glass articles, the combination with means for supplying molten glass, of a post and table rotatably mounted thereon consisting of upper and lower platforms connected by uprights, reversible body molds supported on trunnions, said trunnions having their bearings in said uprights.

19. In a machine for forming glass articles, the combination with means for supplying molten glass, of a rotatable support having a plurality of molds arranged around the same, means for rotating said support to bring said molds successively beneath said glass supply and momentarily retarding the same to receive glass, fluid-pressure means for compressing the glass in said mold, and a blow-pipe for discharging the molten glass from the edge of said mold as the same is carried away from said supply means.

20. In a machine for forming glass articles, in combination with means for supplying molten glass, of a rotatable support having a plurality of molds arranged around the same, carriers for said molds comprising trunnions mounted in bearings so as to be revoluble, said molds being formed of separable halves slidably mounted on said trunnions to move parallel to the axis thereof.

21. In a machine for forming glass articles, in combination with means for supplying molten glass, of a rotatably mounted table consisting of upper and lower platforms, reversible body molds supported with their receiving ends adjacent said upper platform, and movable mold bottoms carried by said lower platform.

22. In a machine for forming glass articles, in combination with means for supplying molten glass, of a rotatable support having a plurality of molds arranged around the same, said molds being formed of separable halves arranged to slide apart and revolubly mounted on their supports so as to be inverted, means for opening and closing said molds, movable mold bottoms arranged to enter said partially opened molds for supporting the glass.

23. In a machine for forming glass articles, the combination with means for supplying molten glass in a continuous stream, of a plurality of molds, and means for bringing the same successively beneath said supply means to receive glass and fluid blast means for removing the superfluous glass from the receiving end of each mold.

24. In a machine for forming glass articles, the combination with means for supplying molten glass, of a mold, a stationary mandrel normally extending partway within said mold, and means for compressing glass within the mold and around the mandrel, said mandrel being yieldingly mounted against movement and arranged to be manually moved for breaking out the same from said glass blank.

25. In a machine for forming glass articles, in combination with means for supplying molten glass, of a mold, a normally-stationary mandrel extending part-way within said mold having a spring tending to keep it in position therein, means for compressing glass within said mold and around said mandrel, said mandrel being mounted so as to be withdrawn from the mold by hand against the force of its spring for breaking out the same from said glass blank.

26. In a machine for forming glass articles, the combination with means for supplying molten glass of a movable support having a plurality of body molds thereon, revoluble carriers for said molds, said body molds being formed of separable halves slidably mounted on said carriers, independent neck molds also formed of separable halves slidable on said carriers, means controlled by the movement of said support for partially opening said body molds while allowing said neck molds to remain closed, the continued movement of opening said body molds acting to open said neck molds.

27. A machine for forming glass articles, in combination, a mold formed of separable halves, means for suspending a blank within said mold, a reciprocating mold bottom coöperating with said mold and arranged to enter said mold for supporting the lower end of said blank, and mechanism for momentarily opening said mold to allow the entrance of said mold bottom and for closing the mold upon the withdrawal of said mold bottom.

28. In a machine for forming glass articles in combination, a body mold formed of separable halves, an independent neck mold for suspending a blank within said body mold, a reciprocating mold bottom coöperating with said body mold and arranged to enter said body mold for supporting the lower end of said blank, and mechanism for momentarily opening said body mold to allow the entrance of said mold bottom and closing said body mold upon the withdrawal of said mold bottom.

29. In a machine for forming glass articles in combination a movable support having a plurality of molds thereon, said molds being formed of separable halves, means for suspending a blank within each mold, a reciprocating mold bottom coöperating with each mold and arranged to enter the same for supporting the lower end of said blank, and mechanism controlled by the movement of said support for momentarily opening each mold, to allow the entrance of said mold bottom, and closing each mold upon the withdrawal of said mold bottom.

30. In a machine for forming glass articles, the combination with means for supplying molten glass, of a movable support with a plurality of molds thereon, driving means for said support, a blow-head, and means controlled by the operation of said driving means for causing said blow-head to close the receiving end of a mold immediately after the same is supplied with glass and direct therein a fluid pressure means for compressing the glass in said mold preparatory to blowing a blank therefrom.

31. In a machine for forming glass articles, the combination with means for supplying molten glass, of a movable support with a plurality of molds thereon, driving means for said support, a blow-head, and means controlled by the operation of said driving means for causing said blow-head to close the receiving end of a mold immediately after the same is supplied with glass and direct therein a fluid pressure means for compressing the glass in said mold, and means for later directing a fluid pressure means into the opposite end of said mold for blowing said blank.

Signed at New York city, N. Y., this 19th day of May, 1909.

HENRY M. BROOKFIELD.

Witnesses:
EMERSON R. NEWELL,
BEATRICE MIRVIS.